UNITED STATES PATENT OFFICE.

ADOLPH U. MESSMER, OF MINNEAPOLIS, MINNESOTA.

CASEIN GLUE.

1,373,518. Specification of Letters Patent. Patented Apr. 5, 1921.

No Drawing. Application filed July 2, 1918. Serial No. 242,994.

*To all whom it may concern:*

Be it known that I, ADOLPH U. MESSMER, citizen of the Swiss Republic, residing at Minneapolis, in the county of Hennepin and State of Minnesota, have invented certain new and useful Improvements in Casein Glue; and I do hereby declare the following to be a full, clear, and exact description of the invention, such as will enable others skilled in the art to which it appertains to make and use the same.

My invention provides a highly improved glue, the said term "glue" being used in a generic sense to include generally adhesives and sizings. This improved glue is prepared in dry powdered form, and when mixed with water, forms an emulsion, free from foam, capable of being readily applied with a brush, spreading machine, or other means, and when dry or set, after application, becomes substantially insolvent or waterproof.

The base or chief element of this improved glue is casein and for best results this casein should be a natural soured or lactic acid casein well washed and dried. Casein, as is well known, is present in the milk of mammals and also in the juice of certain plants and its chemical formula is believed to be substantially $C_{172}N_{44}SPO_{55}H_{274}$.

It is important that the casein used be made from sweet skim milk well washed and properly cared for and substantially free from acids, fats and other foreign substance. Rennet casein or casein that has been overheated in drying so that it has become dark yellow or brown, will not be suitable for making a high grade casein glue. Hence, the casein, even when properly prepared from sweet skim milk must be carefully prepared and thoroughly washed. In any event, the casein should have therein, very little, if any, free acids.

As commercially made, the improved glue, in addition to casein, includes anhydrous tri-sodium phosphate $Na_3PO_4$ (one of the phosphates of soda); calcium hydroxid $Ca(OH)_2$ (an alkaline substance, preferably a high grade calcium lime); sodium chlorid NaCl (commercial salt); collophony (a resin); and a vegetable or mineral oil, preferably petroleum. These materials may be mixed in very greatly varying proportions, but a very highly efficient glue has been made by mixing the same in the following proportions, to wit: casein 100 pounds, sodium phosphate 17 pounds, calcium hydroxid 25 pounds, sodium chlorid 5 pounds, a resin, such as collophony or resin .3 pound and petroleum 4.7 pounds.

Advisably, the process of mixing should be as follows:

First, the collophony is dissolved or mixed in the petroleum, and then these ingredients are mixed into the casein. After this has been done, the other materials in dry powdered form, in almost any manner, may be mixed into the compound. This mixture of the several ingredients will be a dry powder. The petroleum is in such small quantity that it does not give a sticky or pasty formation to the mixture, but nevertheless, acts as a sort of binder, or, in other words, holds the lime dust so that it will not float in the air and will not annoy or be disturbing to the workmen or persons handling the same.

This improved glue has been the result of many years of experimentation on my part, and numerous experiments and tests have thoroughly demonstrated the fact that glue having as its base a natural or self-soured and well washed casein, is much superior to any glue in which any other form of casein is used. Also, it has been found that the tri-sodium phosphate, calcium hydroxid and sodium chlorid, are essential to the best form of glue. The collophony or rosin, together with the petroleum, prevents the formation of lumps and keeps the powder in finely divided form.

The use of an oil like petroleum protects the dry powder against moisture while in storage. The oil, particularly, keeps the powder from becoming so light that it will float or be easily blown into the air. If not treated with the oil and rosin, the powder when handled, while being made, will be of such light nature that it might detrimentally affect the mucus membrane of the workers.

The sodium chlorid or salt aids in liquefying the glue and shortens the time by about thirty minutes, required for the powder to become proper glue emulsion when put into cold water.

I am not able to state the complete action of the salt, but have demonstrated that it is a highly important ingredient and essential to the best results. It seems to cause certain chemical actions which I cannot fully explain but which add very materially both to the adhesive qualities and in respect to the features just above noted.

The calcium hydroxid, together with the tri-sodium phosphate and rosin makes the glue, for all intents and purposes, water proof.

The powdered glue, when mixed with water, will remain in liquid form, suitable for use at least four or five hours without becoming gelatinous at 75° F.; and this is, I believe, due to the combining of the rosin, petroleum, tri-sodium phosphate and sodium chlorid.

This improved glue will preferably join, for example, wood that is damp, oily, resinous, varnished, or shellacked, at the adjoining edges. Hence, to use this glue, it is not necessary that the wood be either air or kiln dried. The glue may be used with the greatest success in joining rock, glass, leather, concrete, china, canvas, felt, burlap, silk, iron paper, etc. It will also unite any of these different materials and others. The glue has very great efficiency in uniting, for example, paper labels, and the like, to glass and tin. Also, for example, it will very securely unite linoleum to wood and concrete. As already indicated, this glue is highly efficient for use in a sizing for walls to which paper, wall paper, or other wall covering or decorations are to be applied.

This dry powdered glue forming substance will be dissolved in cold water and form an emulsion, free from foam, and suitable for application as glue in about fifteen minutes. The powdered glue, if kept dry, will remain in condition for use for many years. Glue applied to wooden blocks tightly pressed together will set in about one-half hour so that they may be handled in the usual way by workmen. The complete setting and drying under ordinary conditions will take about twelve hours, but the adhesive quality will continue to improve for several days.

Blocks of wood have been stuck together by this improved glue and then submerged in water for more than a year and when removed have been found still to be tightly stuck together by the glue. The set glue is, therefore, substantially water-proof or for all intents and purposes, insoluble in water. It has successfully and repeatedly withstood the test at various times prescribed by the U. S. Government for aeroplane service. One such test is that a three-ply birch veneer panel $\frac{3}{16}$ inch thick be boiled for eight hours and thereafter soaked for fourteen days and then baked for twenty-four hours. Such treatment does not separate or loosen up the veneers stuck together with this improved glue.

The statement has been made above that this glue mixed in water will remain in condition for use at least four or five hours, but, as a matter of fact, it may be so mixed that it will stand for as much as sixty hours. Advisably, however, it should be used within the first few hours because its water-proof quality is lost, to some extent, when it stands for a longer time.

As also above stated, I have found that well washed, natural soured or lactic acid casein is superior to all others but nevertheless when the various other ingredients are used a very good glue can be made with casein produced by acid processes providing the acid be well washed out of the casein.

Also the statement has been made that the dry compound mixed in cold water will form a proper emulsion for use as glue in about 15 minutes. As a matter of fact, in about 5 minutes, it will have the appearance of being a good glue and will, in fact, do very good work, but will not reach its best condition for use as glue until it has stood for about 15 minutes.

Broadly expressed, casein is an albuminoid; tri-sodium phosphate and high grade calcium lime are both alkaline compounds; and sodium chlorid is a halid which acts upon the casein or the albuminoids as a catalytic hydrolyzing agent. The oil, which is preferably a mineral oil, acts as a protecting agent for preventing the lime or calcium compound from carbonating. Moreover, it prevents the dry glue material from getting into a dusty form. The calcium compound entering into the composition makes the glue a thoroughly water-proof glue, or insoluble in water.

Various casein glues have been proposed in prior patents and elsewhere but the applicant believes that he is the first to put upon the market a casein glue which has such adhesive qualities as to make it a good substitute for animal glues; in fact, the applicant's improved glue is far superior to any of the known animal glues, or heretofore used casein glue.

What I claim is:

1. A glue composition comprising natural soured or lactic acid casein, anhydrous tri-sodium phosphate, calcium hydroxid, sodium chlorid, a resin and an oil.

2. A dry powdered glue composition comprising casein, phosphate of soda, calcium hydroxid, sodium chlorid, rosin and a mineral oil.

3. A dry powdered glue composition comprising natural soured or lactic acid casein, anhydrous tri-sodium phosphate, a high grade calcium lime, sodium chlorid, rosin and petroleum.

In testimony whereof I affix my signature in presence of two witnesses.

ADOLPH U. MESSMER.

Witnesses:
HARRY D. KILGORE,
F. D. MERCHANT.